US011704309B2

(12) United States Patent
Carter et al.

(10) Patent No.: US 11,704,309 B2
(45) Date of Patent: Jul. 18, 2023

(54) SELECTIVE USE OF DATA STRUCTURE OPERATIONS FOR PATH QUERY EVALUATION

(71) Applicant: Microsoft Technology Licensing, LLC, Redmond, WA (US)

(72) Inventors: Andrew J. Carter, Kirkland, WA (US); Yiming Yang, Danville, CA (US); Jiajun Yao, San Jose, CA (US); Siddharth Shah, Pittsburgh, PA (US); Dhruvesh Rathore, San Francisco, CA (US); Tiance Liang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 17/362,907

(22) Filed: Jun. 29, 2021

(65) Prior Publication Data
US 2022/0414092 A1    Dec. 29, 2022

(51) Int. Cl.
*G06F 16/24*     (2019.01)
*G06F 16/242*    (2019.01)
*G06F 16/2453*   (2019.01)

(52) U.S. Cl.
CPC ...... *G06F 16/2425* (2019.01); *G06F 16/2453* (2019.01)

(58) Field of Classification Search
CPC .......................... G06F 16/2425; G06F 16/2453
See application file for complete search history.

(56) References Cited

U.S. PATENT DOCUMENTS

| 6,748,377 B1* | 6/2004 | Attaluri | G06F 16/24528 |
| | | | 707/999.005 |
| 8,595,215 B2* | 11/2013 | Hattori | G06F 16/8365 |
| | | | 707/718 |
| 9,378,241 B1* | 6/2016 | Shankar | G06F 16/28 |
| 9,535,963 B1* | 1/2017 | Shankar | G06F 16/337 |
| 9,785,673 B2* | 10/2017 | Bornea | G06F 16/24545 |
| 10,474,656 B1* | 11/2019 | Bronnikov | G06F 16/217 |
| 10,983,997 B2 | 4/2021 | Carter et al. | |
| 2012/0221604 A1* | 8/2012 | Gao | G06F 16/8373 |
| | | | 707/E17.044 |

(Continued)

*Primary Examiner* — Alford W Kindred
*Assistant Examiner* — Tiffany Thuy Bui
(74) *Attorney, Agent, or Firm* — Nicholson De Vos Webster & Elliott LLP

(57) ABSTRACT

The disclosed technologies are capable of selectively using data structure operations for path query evaluation. One technique involves reading a query that traverses at least two nodes and at least one edge of a graph in a graph database; compiling the query into a set of variables and a set of constraints, where the set of variables and the set of constraints correspond to the two nodes and the one edge of the graph; creating an in-memory data structure that comprises a table; using the set of variables and the set of constraints to determine an operation that is performable using the in-memory data structure; checking for an existence of a condition relating to the in-memory data structure or the operation; skipping the operation if the condition exists or executing the operation if the condition does not exist; and storing a set of intermediate query results in the table.

16 Claims, 11 Drawing Sheets

(56) References Cited

U.S. PATENT DOCUMENTS

| | | | |
|---|---|---|---|
| 2013/0060753 A1* | 3/2013 | Lukichev | G06F 16/2456 |
| | | | 707/718 |
| 2015/0081654 A1* | 3/2015 | Spangler | G06F 16/3325 |
| | | | 707/723 |
| 2015/0234888 A1* | 8/2015 | Ahmed | G06F 16/2425 |
| | | | 707/765 |
| 2018/0089265 A1* | 3/2018 | Gerard | G06F 16/2453 |
| 2019/0296997 A1* | 9/2019 | Menon | H04L 43/16 |
| 2021/0097054 A1 | 4/2021 | Carter et al. | |

\* cited by examiner

SELECTIVE USE OF DATA STRUCTURE OPERATIONS FOR PATH QUERY EVALUATION

TECHNICAL FIELD

A technical field to which the present disclosure relates is path query evaluation for distributed graph databases.

BACKGROUND

A distributed data processing system provides a software framework for distributed storage and processing of data on a large scale. A distributed software framework may store portions of a database across many different computers on a network. The distributed data processing system coordinates data create, read, write, update, and delete operations, query operations, and computations across the network of computers.

There are different types of distributed database architectures including graph architectures and non-graph architectures. Examples of non-graph architectures include relational databases and key-value stores. In relational databases, data is organized according to a schema that includes tables and keys. A table stores data according to a logical arrangement of rows and columns. Keys are used to join data stored in different tables together. A structured query language (SQL) is used to construct and execute queries and to create, update, and manipulate tables and keys. A query result from a relational database may include data retrieved from different tables of the relational database.

Graph databases organize data using a graph data structure that includes a number of interconnected graph primitives. Examples of graph primitives include nodes, edges, and predicates, where a node stores data, an edge creates a relationship between two nodes, and a predicate is a semantic label assigned to an edge, which defines or describes the type of relationship that exists between the nodes connected by the edge.

A node of a graph database may correspond to a table, a subset of a table, or set of rows and columns of different tables of a non-graph database. Another example of a graph primitive is a particular portion of a graph or a sub-graph, such as a specific pair of nodes plus an edge by which the nodes are connected. A graph query language is used to construct and execute queries on the graph database and to create, update, and manipulate components of a graph database. With a graph database, query results include a subset of the graph stored in the graph database; e.g., one or more graph primitives.

A distributed system may be organized according to an arrangement of computers on a network that is designed for query throughput, response time, reliability, scalability, or performance. For example, a distributed system may include multiple data centers, where each data center resides at a different physical, geographic location, and each data center contains a complete copy of the database. Data centers may receive updated copies of the database through a replication process. Each data center may include multiple clusters of server computers, and each cluster or server computer may include one or more machines. In a distributed system, portions of a database or an index may be logically divided into shards. The different shards may be stored in the same machine or on different machines of the distributed system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
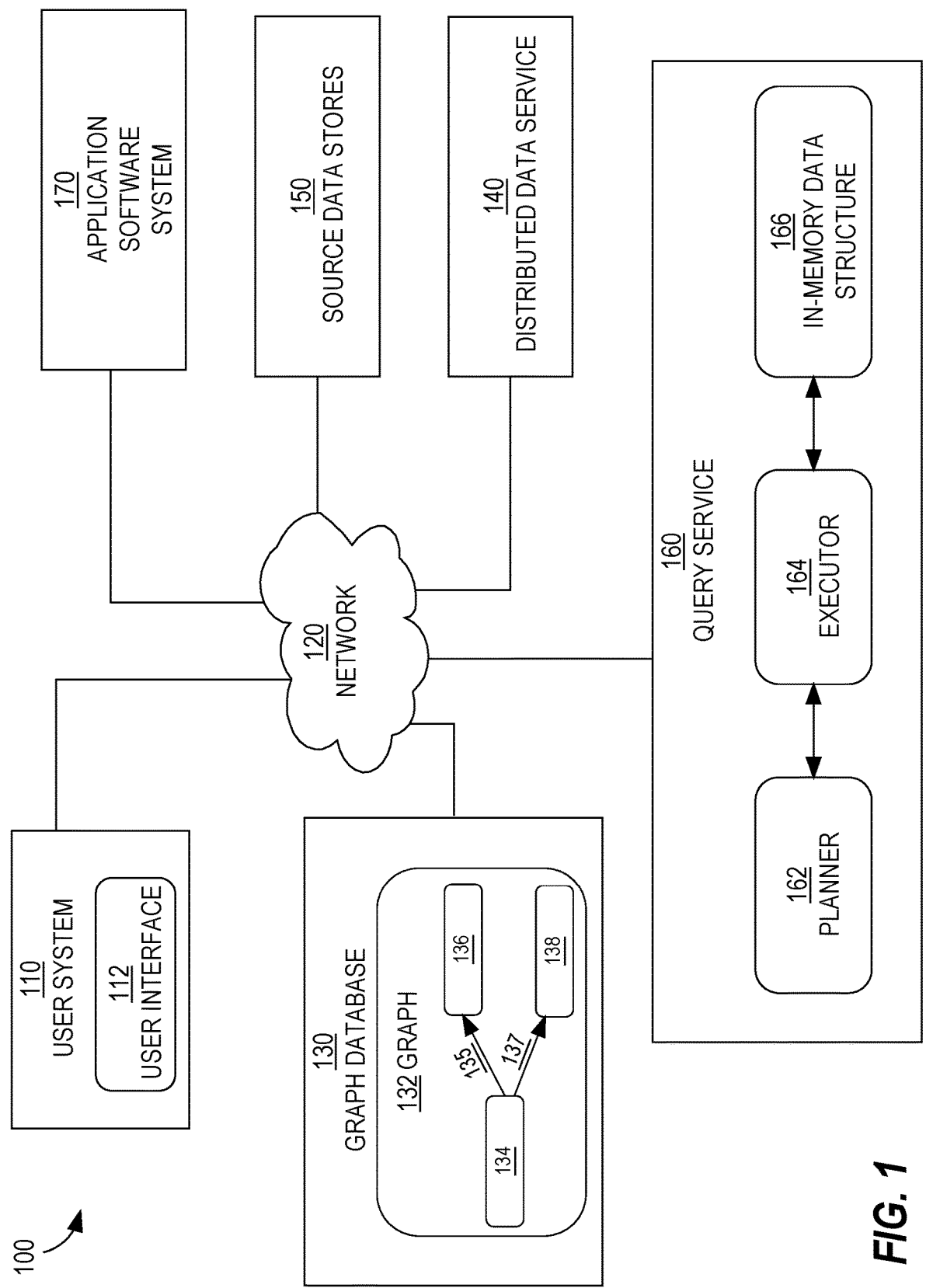
FIG. 1 is a block diagram illustrating at least one embodiment of a computing system in which aspects of this disclosure may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Network-based software applications often store and process massive amounts of data. For example, connections network systems, such as social media applications and applications based thereon, may create, store, query, and perform complex operations on billions of data records every day.

Network-based software applications often include search functionality that allows users to enter queries to search for and retrieve data records that match the users' search criteria. An example of a search criterion is a keyword, such as an entity name, job title or skill. Example of data records include user profiles, job postings, news feed items, and comments.

In applications that use or are based on a social graph, complicated operations may need to be performed to determine the correct set of query results. For instance, it may require several operations for the system to determine the first, second, or third-degree connections of an entity, particularly if the entity has a large number of connections. As another example, determining which of an entity's connections match a particular search query may require the system to perform a complicated set of operations, especially if the query contains multiple search criteria.

To improve the efficiency of performing these and other query processing operations, and to improve the speed at which accurate query results are retrieved from a database, a query may be divided into a set of sub-queries. The sub-queries may be individually evaluated by the query processor.

Intermediate results produced by the evaluation of sub-queries may be stored in an in-memory data structure. The in-memory data structure is created dynamically during the query evaluation process for a particular query. As such, the in-memory data structure is not part of the graph or the graph database. The in-memory data structure may include multiple different interrelated tables that each store a set of intermediate query results. Intermediate query results are stored in rows of the tables. Information about the relationships between the tables of the in-memory data structure also may be stored in rows of the tables of the in-memory data structure or using links between rows of different tables in the in-memory data structure.

A path query is a type of query that traverses at least two nodes and at least one edge of the graph in the graph database. Path queries can be computationally expensive because they require multiple different tables to be created in the in-memory data structure that are interrelated by, for example, parent-child relationships. A set of tables and inter-table relationships within the in-memory data structure may be referred to as an execution path. Creating tables and traversing execution paths in the in-memory data structure can increase the processing time and computing resources needed to resolve path queries.

As used herein, a distinction is made between a path query and an execution path. The word path when used in the term path query may refer to a path that a query takes through the graph in the graph database. When used in the term execution path, the word path may refer to a path through an in-memory data structure that is created during execution of a path query.

One technical challenge with evaluating path queries is to generate results quickly while ensuring correctness of the query results. Correctness of the query results can be ensured by enforcing path consistency rules. Path consistency rules ensure correctness of the query results because they ensure traceability of rows of data in child tables back to the same rows of the parent tables. However, ensuring path consistency often requires operations to be performed that create new tables and inter-table relationships in the in-memory data structure. The creation of each new table and interrelationship in the in-memory data structure generates additional overhead, which can increase the amount of time required to resolve a query.

As described in more detail below, the disclosed technologies address these and other technical challenges by selectively omitting or deferring the execution of certain operations on the in-memory data structure that otherwise would be performed by the prior approaches. For example, the disclosed technologies can selectively omit or defer certain path consistency checking operations and/or table creation operations under certain conditions.

As used herein, node may refer to a node in a graph of a graph database and not to a computer in a network of computers. As used herein, node also may be used to refer to a sub-structure of an in-memory data structure, such as a table or an execution head, which contains table header information of a table of an in-memory data structure. Table as used herein may refer to a logical table of an in-memory data structure, which organizes data according to rows and columns. Machine as used herein may refer to a physical machine, such as a server computer, or a virtual machine running on a server computer. A machine may include one or more processors, such as one or more microprocessors.

The above-described advantages and benefits are provided as examples. The disclosed technologies are not limited to these examples and may provide additional or different advantages and benefits than those described above.

Example Use Case

The disclosed technologies may be described with reference to the example use case of path query evaluation for a distributed graph database in the context of a network application; for example, a social graph application such as a professional social network application.

Other Use Cases

The disclosed technologies are not limited to social graph applications but can be used to perform path query evaluation for graph databases more generally. The disclosed technologies may be used by many different types of network applications in which queries are resolved using a graph database and path query evaluation is needed.

Example Computing System

FIG. 1 illustrates a computing system in which embodiments of the features described in this document can be implemented. In the embodiment of FIG. 1, computing system 100 includes a user system 110, a network 120, a graph database 130, a distributed data service 140, a set of source data stores 150, a query service 160, and an application software system 170.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 may be or include a front-end portion of application software system 170.

User interface 112 is any type of user interface as described above. User interface 112 may be used to input search queries and view or otherwise perceive output that includes data retrieved by query service 160 and/or produced by application software system 170. For example, user interface 112 may include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein may include application programming interfaces (APIs).

Graph database 130 is a graph database that contains data that may be retrieved and/or manipulated by query service 160 generate query results. In some implementations, portions of graph database 130 may be part of or accessed by or through another system, such as distributed data service 140. Data is ingested into graph database 130 and stored in a graph 132. Graph 132 includes any number of nodes, edges, and predicates; for example, nodes 134, 136, 138, edges 135, 137, and predicates, which are semantic labels for the edges.

Distributed data service 140 stores portions of graph database 130 in a distributed manner. Distributed data service 140 includes a number of data services that may perform different parts of a query processing task. As used herein, data service may refer to a physical, geographic grouping of machines, a logical grouping of machines, or a single machine. For example, a data service may be a data center, a cluster, a group of clusters, or a machine. A data service 142 may store a complete copy of graph database 130 or only one or more portions of graph database 130.

Portions of a query processing task may be distributed across one or more data services of distributed data service 140. To perform its portion of the query processing task, a data service 140 may create one or more in-memory data structures 166 and perform operations on the one or more in-memory data structures 166. An in-memory data structure 166 is created dynamically during query processing and is not stored statically. An in-memory data structure is a data structure that is stored in volatile memory (e.g., RAM). Storing data "statically" means that the data is stored on disk or in persistent/non-volatile storage. Distributed data service 140 may be accessed by query service 160 during processing of a query.

Source data stores 150 store the source of truth data that is consumed by graph database 130. Source data stores 150 may be accessed by query service 160 via graph 132 and/or in-memory data structure 166 to retrieve and store query results. For example, intermediate query results may be retrieved from source data stores 150 and stored in in-memory data structure 166 during query processing.

Source data stores 150 may reside on at least one persistent and/or volatile storage device that may reside within the same local network as at least one other device of computing system 100 and/or in a network that is remote relative to at least one other device of computing system 100. Thus, although depicted as being included in computing system 100, portions of source data stores 150 may be part of computing system 100 or accessed by computing system 100 over a network, such as network 120.

Query service 160 interprets, processes and executes queries against graph database 130. In doing so, query service 160 may create or initiate the creation of one or more in-memory data structures 166. As another example, query service 160 may initiate one or more query planning operations by planner 162 and/or initiate the execution of one or more path execution operations on an in-memory data structure 166 by executor 164. Portions of query service 160 may be part of or accessed by or through another system, such as distributed data service 140 or application software system 170. For example, portions of query service 160 may be distributed to individual data services (or shards) of distributed data service 140. Query service 160 may be implemented using a declarative query language such as datalog. Operation of query service 160 is described in more detail below with reference to FIG. 5.

Application software system 170 is any type of application software system that includes or utilizes functionality provided by query service 160. Examples of application software system 170 include but are not limited to connections network software, such as social media platforms, and systems that may or may not be based on connections network software, such as general-purpose search engines, job search software, recruiter search software, sales assistance software, advertising software, learning and education software, or any combination of any of the foregoing.

While not specifically shown, it should be understood that any of user system 110, graph database 130, distributed data service 140, source data stores 150, query service 160, and application software system 170 includes an interface embodied as computer programming code stored in computer memory that when executed causes a computing device to enable bidirectional communication with any other of user system 110, graph database 130, distributed data service 140, source data stores 150, query service 160, and application software system 170 using a communicative coupling mechanism. Examples of communicative coupling mechanisms include network interfaces, inter-process communication (IPC) interfaces and application program interfaces (APIs).

A client portion of application software system 170 may operate in user system 110, for example as a plugin or widget in a graphical user interface of a software application or as a web browser executing user interface 112. In an embodiment, a web browser may transmit an HTTP request over a network (e.g., the Internet) in response to user input that is received through a user interface provided by the web application and displayed through the web browser. A server running query service 160 and/or a server portion of application software system 170 may receive the input, perform at least one operation using the input, and return output using an HTTP response that the web browser receives and processes.

Each of user system 110, graph database 130, distributed data service 140, source data stores 150, query service 160, and application software system 170 is implemented using at least one computing device that is communicatively coupled to electronic communications network 120. Any of user system 110, graph database 130, distributed data service 140, source data stores 150, query service 160, and application software system 170 may be bidirectionally communicatively coupled by network 120. User system 110 as well as one or more different user systems (not shown) may be bidirectionally communicatively coupled to application software system 170 or query service 160.

A typical user of user system 110 may be an administrator of graph database 130, an administrator of a distributed data service 140, an administrator of application software system 170, or an end user of application software system 170. User system 110 is configured to communicate bidirectionally with any of graph database 130, distributed data service 140, source data stores 150, query service 160, and application software system 170 over network 120.

The features and functionality of user system 110, graph database 130, distributed data service 140, source data stores 150, query service 160, and application software system 170 are implemented using computer software, hardware, or software and hardware, and may include combinations of automated functionality, data structures, and digital data, which are represented schematically in the figures. User system 110, graph database 130, distributed data service 140, source data stores 150, query service 160, and application software system 170 are shown as separate elements in FIG. 1 for ease of discussion but the illustration is not meant to imply that separation of these elements is required. The illustrated systems, services, and data stores (or their functionality) may be divided over any number of physical systems, including a single physical computer system, and can communicate with each other in any appropriate manner.

Network 120 may be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

It should be understood that computing system 100 is just one example of an implementation of the technologies disclosed herein. While the description may refer to FIG. 1 or to "system 100" for ease of discussion, other suitable configurations of hardware and software components may be used to implement the disclosed technologies. Likewise, the particular embodiments shown in the subsequent drawings and described below are provided only as examples, and this disclosure is not limited to these exemplary embodiments.

Example Execution Path Operation

Figure 2A:
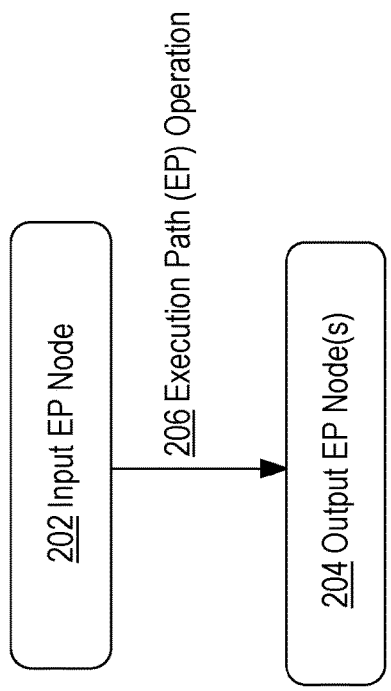
FIG. 2A is a flow diagram of a process that may be used to implement a portion of the computing system of FIG. 1.

FIG. 2A is a flow diagram of a process that may be used to implement a portion of the computing system of FIG. 1. The operations of a flow 200 as shown in FIG. 2A can be implemented using processor-executable instructions that are stored in computer memory. For purposes of providing a clear example, the operations of FIG. 2A are described as performed by computing system 100, but other embodiments may use other systems, devices, or implemented techniques.

More specifically, FIG. 2A illustrates an example of an execution path that may be implemented by, for example, query service 160, during the evaluation of a query. The execution path of FIG. 2A includes an input execution path (EP) node 202. EP node 202 includes, for example, a table of an in-memory data structure 166 that is created to store and process intermediate query results and an execution head, which contains table header information of the table of the in-memory data structure 166. For example, EP node 202 may include a table that stores a set of intermediate query results produced by execution of a first sub-query of an input query. As another example, EP node 202 may be an execution head, which contains table header information for a table that is not yet created.

In the case where input EP node 202 stores a set of intermediate results, an execution path operation 206 is performed on the set of intermediate query results stored in input EP node 202. The result of executing EP operation 206 on the data stored in EP node 202 may be another set of intermediate query results. This second set of intermediate query results, which has been generated or derived from the set of intermediate results stored in EP node 202, is stored in one or more output execution path nodes 204. The number of output EP nodes 204 is determined based on the type of EP operation 206 that is performed on input EP node 202 and also may be determined based on the number of rows of data stored in EP node 202. Examples of EP operations that may be performed on EP nodes are shown in FIG. 4A, FIG. 4B, FIG. 4C, and FIG. 4D, described below. EP nodes 204 and 202 are linked by a relationship that is defined by EP operation 206. The link between EP node 202 and EP node 204 may be stored in either or both of EP nodes 202, 204.

Example In-Memory Data Structure

Figure 2B:
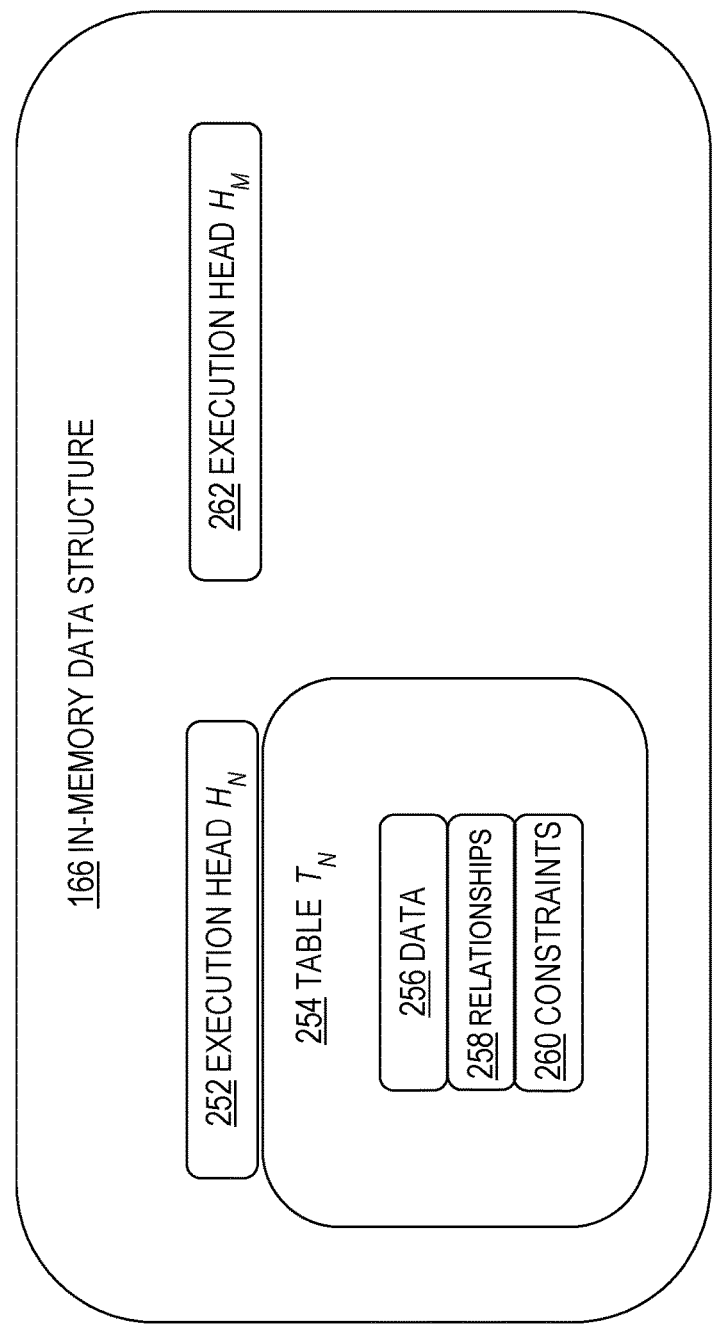
FIG. 2B illustrates an example of in-memory data structures that may be created and processed by a portion of the computing system of FIG. 1.

FIG. 2B illustrates an example of in-memory data structures that may be created and processed by a portion of the computing system of FIG. 1. More specifically, FIG. 2B illustrates an example of in-memory data structure 166 that may be created when it has been determined that a query that has been received from, for example, application software system 170, is a path query. In-memory data structure 166 includes an execution head $H_N$ 252, a table $T_N$ 254 and an execution head $H_M$ 262. Execution head $H_N$ 252 may be referred to as a real execution head because it is linked to a table, i.e., table 254.

As a query is executed, query service 160 creates EP nodes in the in-memory data structure 166 for the query variables and maps the EP nodes to their corresponding query variables. This mapping of EP nodes of the in-memory data structure 166 to query variables is maintained by the execution heads.

Execution head 252 illustrates one execution head $H_N$ of N real execution heads of in-memory data structure 166. That is, in-memory data structure 166 may have any number N of real execution heads, where N is a positive integer, and corresponding tables $T_N$.

Table 254 illustrates one table $T_N$ of the N tables of in-memory data structure 166. Table 254 includes data 256, relationships 258, and constraints 260. Data 256 includes a set of intermediate query results. Relationships 258 are the inter-table links; i.e., links between rows of different tables. Relationships 258 can be one-to-one or one-to-many. Relationships 258 may store information that identifies the tables that are connected by the link, and may further identify the type of link or relationship between the linked tables. Examples of types of relationships are conjunctive and disjunctive. Conjunctive corresponds to the AND boolean operation or the INTERSECTION set operation. Disjunctive corresponds to the OR boolean operation or the UNION set operation. For example, a row of data 256 may be linked to one or more rows of another table 254 of in-memory data structure 166.

Constraints 260 are limiting criteria that must be satisfied in order for a query to be resolved. Constraints may be applied to variables, where a variable represents a search criterion. In a graph query, a variable may correspond to a node of the graph, an edge, or a predicate. Examples of variables are "employer" and "education." An example of a constraint on the employer variable is a name of a specific employer, and an example of a constraint on the education variable is a particular type of college degree. A constraint is satisfied if, for example, all rows in the intermediate result set contain data that matches the constraint or there is no row in the intermediate result set that contains data that does not match the constraint. If all constraints 260 are satisfied, then the intermediate result set stored in table 254 may become part of a final set of query results that may be returned to, for example, application software system 170.

Execution head 262 illustrates one execution head $H_M$ of M execution heads of in-memory data structure 166 that do not have corresponding tables, where M is a positive integer that may have a different value than the value of N. Execution head 262 may be referred to as a phantom execution head because it is not, or not yet, linked to a table. Phantom execution heads are described in more detail below with reference to FIG. 3A.

Examples of Path Query Evaluation Improvements

Figure 3A:
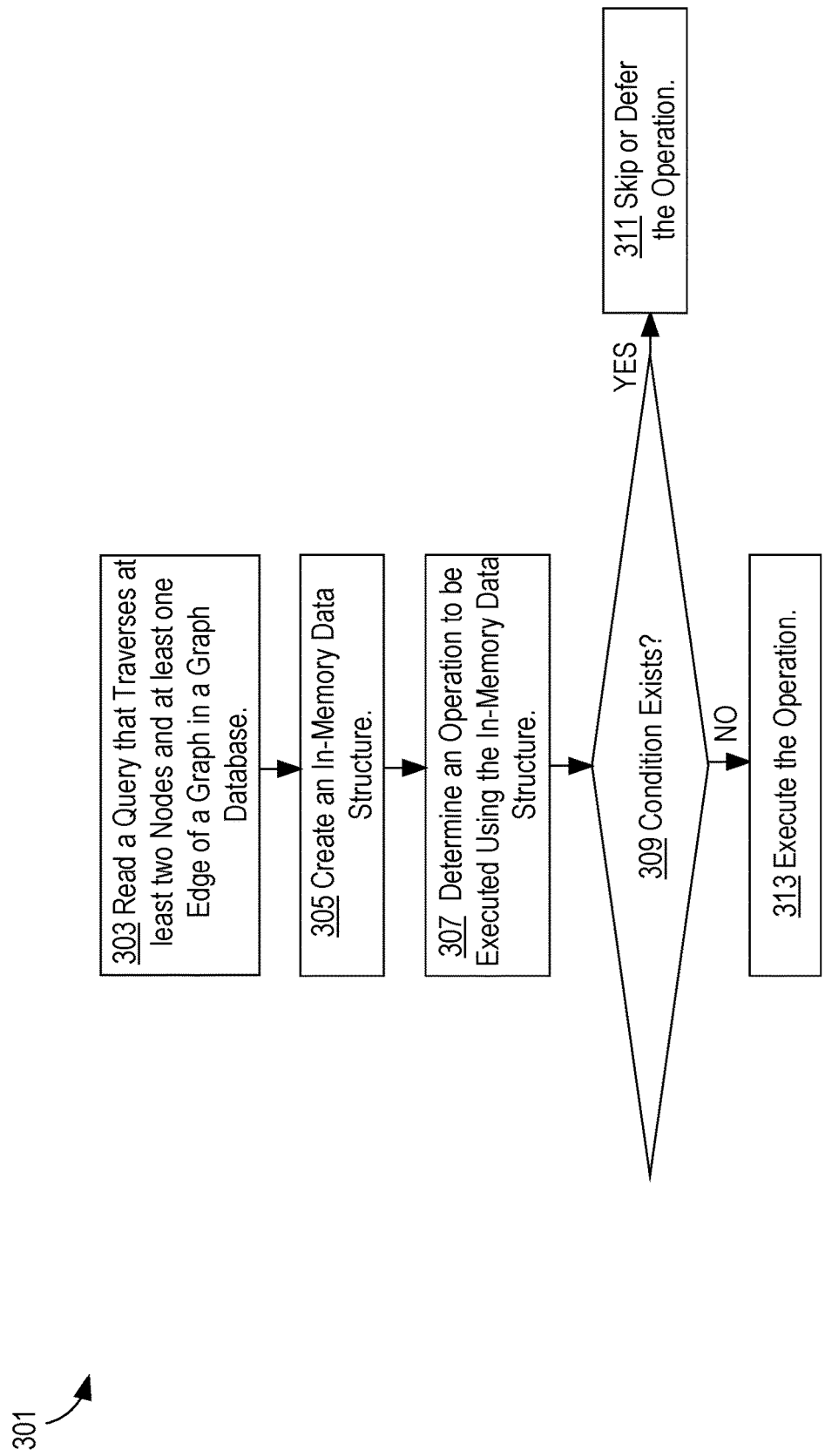
FIG. 3A is a flow diagram of a process that may be used to implement a portion of the computing system of FIG. 1.

FIG. 3A is a flow diagram of a process that may be used to implement a portion of the computing system of FIG. 1. The operations of a flow 301 as shown in FIG. 3A can be implemented using processor-executable instructions that are stored in computer memory. For purposes of providing a clear example, the operations of FIG. 3A are described as performed by a machine of computing system 100, but other embodiments may use other systems, devices, or implemented techniques. More specifically, flow 301 illustrates operations that may be performed by, for example, query service 160, to evaluate a path query.

Operation 303 when executed by one or more machines causes the one or more machines to read a query that traverses at least two nodes and at least one edge of a graph in a graph database, e.g., a path query. Operation 303 may include, for example, reading a string (e.g., alphanumeric text) that has been passed to query service 160 by application software system 170. Operation 303 may include compiling the query into a set of variables and a set of constraints that collectively correspond to the at least two nodes and the at least one edge of the graph, collectively. Alternatively, a process of compiling the query into variables and constraints may be performed prior to operation 303, for example by a query translator/compiler component of query service 160.

Operation 305 when executed by one or more machines causes the one or more machines to creating an in-memory data structure 166 that includes at least one table. Operation 305 includes, for example, creating an execution path node such as input EP node 202, described above.

Operation 307 when executed by one or more machines causes the one or more machines to, using the set of variables and the set of constraints provided by operation 303, determine an execution path operation that may be performed using the in-memory data structure 166. The execution path operation to be performed is determined by the applicable constraints, e.g., constraints 260, and the number of rows in the table of the input EP node. Examples of execution path operations are shown in FIG. 4A, FIG. 4B, FIG. 4C, and FIG. 4D, described below. For instance, execution path operations may include one or more path consistency checking operations. Other examples of execution path operations are operations that create, in the in-memory data structure 166 created in operation 305, execution heads and operations that create tables.

Operation 309 when executed by one or more machines causes the one or more machines to check for an existence of a condition relating to the in-memory data structure 166 created in operation 305 or the execution path operation determined in operation 307. Examples of conditions that may be the subject of operation 309, which are described in more detail below, include the existence of a single row variable, a determination that an execution path operation is not going to perform meaningful work (such as a selective operation and edge materialization, both of which are described in more detail herein), and a determination that an unzip operation does not need to be performed on a disjunction. A zip operation produces a cross product from source rows in multiple tables while ensuring that all paths from each row in the cross product reach a common row in all ancestors of the multiple tables. A purpose of an unzip operation is to deduplicate entries in a relation.

If a condition pertains to the existence of single row variables and a single row variable exists, then operation 311 is performed. As another example, if the condition pertains to whether an execution path operation is not going to perform meaningful work and the condition is false or in the negative (meaning the execution path operation is going to perform meaningful work), then operation 313 is performed.

Operation 311 when executed by one or more machines causes the one or more machines to, if the condition exists, skip the execution path operation determined in operation 307 and store a set of intermediate query results in a table of the in-memory data structure 166. Skipping the execution path operation may include skipping a path consistency checking operation or skipping or delaying the creation of a table. Storing a set of intermediate query results in a table may include creating an output EP node, e.g., output EP node 204, and storing data, e.g., data 256, in one or more rows of a table of the output EP node.

Operation 313 when executed by one or more machines causes the one or more machines to, if the condition does not exist, execute the execution path operation determined in operation 307. Executing the EP operation may include executing a path consistency checking operation or creating a table of an EP node of the in-memory data structure 166.

Single Row Variables

In flow 301, operation 309 may include checking for the existence of the condition by determining whether a variable of the query is a single row variable. A single row variable is a variable that only returns one row of data when the query is executed. For example, in a query, "who is following Richard Branson?" both "following" and "Richard Branson" are single row variables because there can be only one of them in the query. The query results that are returned from executing that query will be a multi-row variable, not a single row variable, assuming that multiple people follow Richard Branson.

If a query contains at least one single row variable, then the query does not need to be checked for path consistency for the single row variable. Thus, in operation 309 of FIG. 3A, if a variable of a query is a single row variable, then the condition exists. As a result, in operation 311, skipping the operation includes skipping a path consistency checking operation for the single row variable. If the query contains other variables that are not single row variables, then path consistency checking operations would be performed for the non-single row variables but not for the single row variables. Examples of path consistency checking operations include a zip operation (FIG. 4C, described below) and an unzip operation (FIG. 4D, described below). Skipping an operation may include skipping a zip operation or replacing a zip operation with a stitch operation.

If, in operation 311, a path consistency checking operation is skipped for the single row variable, then a set of intermediate query results may be read from a data storage into the in-memory data structure 166 for the single row variable without performing the path consistency checking operation.

Alternatively or in addition, operation 309 may include determining if the query contains at least one multi-row variable. If the query contains a multi-row variable, then operation 309 may conclude that the condition does not exist for the multi-row variable. As a result, operation 313 may execute a path consistency checking operation for the multi-row variable but not for any single row variables contained in the query. Thus, operation 313 may include executing the path consistency checking operation for the multi-row variable prior to reading intermediate query results from a data storage into the in-memory data structure 166 for the multi-row variable.

Figure 3B:
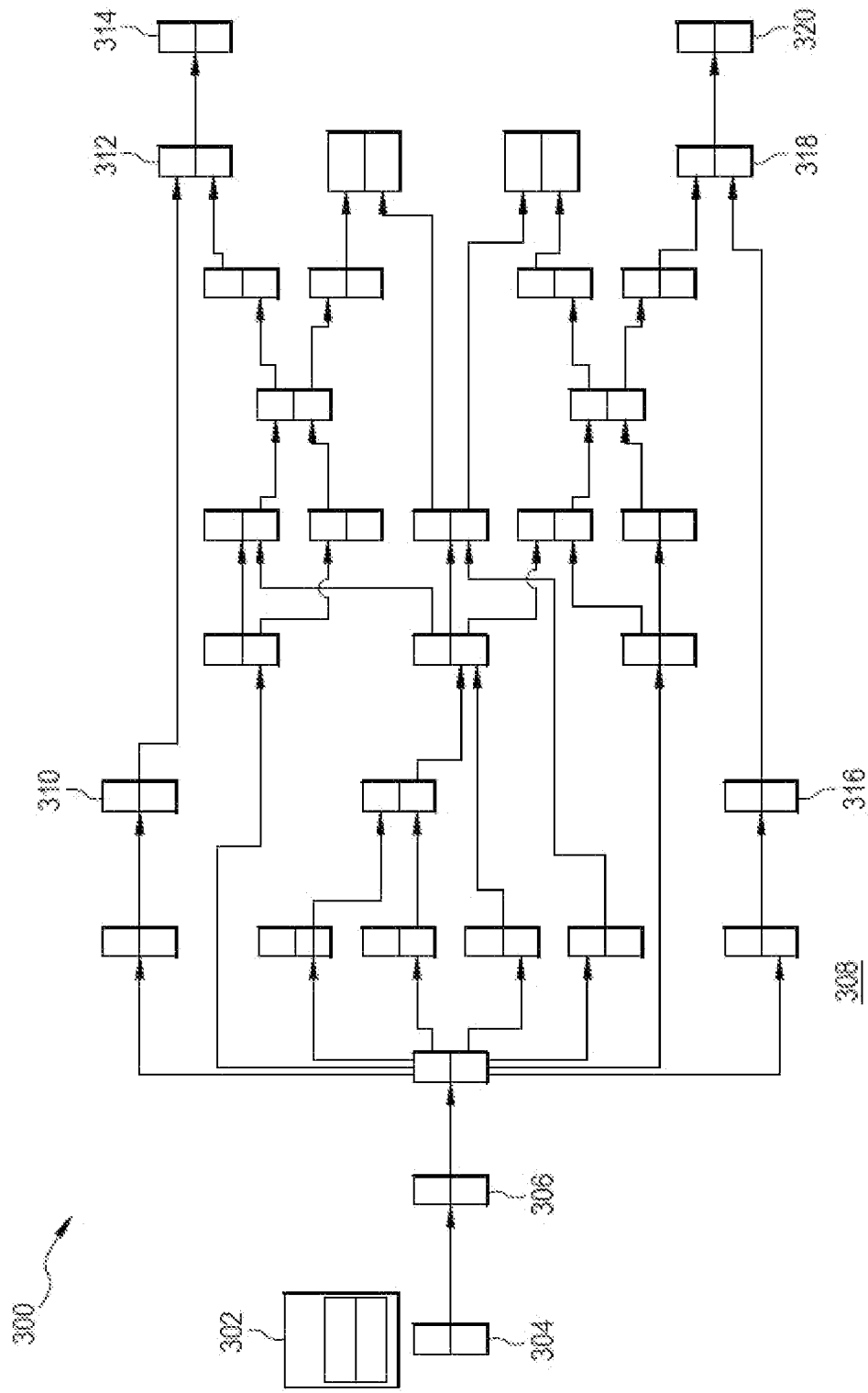
FIG. 3B illustrates an example of an in-memory data structure that may be created and processed using a prior approach to path query evaluation.
Figure 3C:
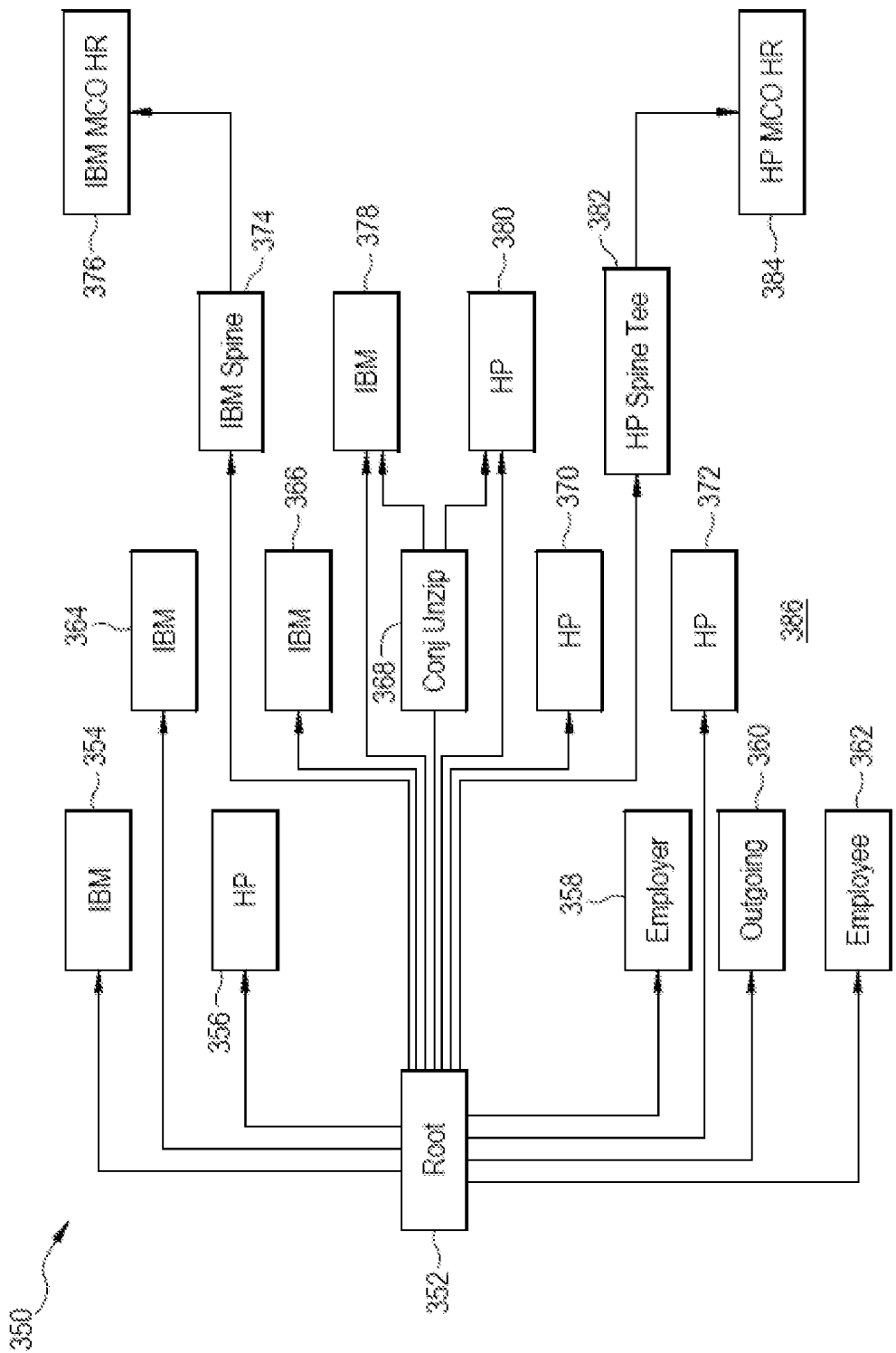
FIG. 3C illustrates an example of an in-memory data structure that may be created and processed by a portion of the computing system of FIG. 1.

FIG. 3B illustrates an example of an in-memory data structure 166 that may be created and processed using a prior approach to path query evaluation, for the query, "find all the people who have worked for both IBM and HP." FIG. 3C illustrates an example of an in-memory data structure 166 that may be created and processed by a portion of the computing system of FIG. 1 for the same query.

As can be seen from a comparison of FIG. 3B to FIG. 3C, the disclosed approach of skipping path consistency checking for single row variables greatly simplifies the query execution. In the prior approach shown in FIG. 3B, an in-memory data structure 302 includes a number of execution path nodes including root node 304, node 306, an expand operation 308, an execution path including nodes 310, 312, and 314, and another execution path including nodes 316, 318, and 320.

Using the disclosed approach eliminates several zip operations, as shown in FIG. 3C. In the situation where nodes have multiple rows, there is a need to zip together all of the nodes (including nodes 354 and 356) in order to get a node that has access to all of the variables. Zipping is done for path consistency reasons. Because single rows are trivially path consistent, the disclosed approach avoids a needless zip operation. In FIG. 3C, an in-memory data structure 350 includes a root node 352, which is used to connect unrelated parts of the query. The variables are represented by nodes 354, 356, 358, 360, 362. Nodes 354 and 356 are single row variables. Nodes 358 and 362 are modeled as 2-hop relationships. Node 360 stores internal metadata. (Node 360 corresponds to an edge lookup operation and the lookup is "outgoing" because the operation is going from subject to object, whereas an edge lookup operation is "incoming" if the operation is going from object to subject.) Nodes 364, 366, 374, 376 are involved in the execution path operations to determine the subset of all employees of IBM. Nodes 370, 372, 382, 384 are involved in similar execution path operations to determine the subset of all employees of HP. Nodes 368, 378, and 380 are involved in a conjunctive join of the subset of all employees of IBM with the subset of all employees of HP.

It is not necessary to know at the beginning of query processing which variables are single row variables and which variables are not single row variables. Whether a variable is a single row variable can be determined at any stage of the query processing by counting, in the in-memory data-structure for the query, the number of rows stored in the node for that variable. Also, a variable may not start out as a single row variable but through query processing may become a single row variable later.

Phantom Execution Head

In flow 301, operation 309, another example of a condition involves determining whether the execution path operation determined in operation 307 of FIG. 3A will produce meaningful work. An example of meaningful work is an operation that directly helps resolve a query; for example, a selective operation. An example of a selective operation is an execution path operation that reduces the number of rows in a set of intermediate query results; for example, a join operation. Another example of meaningful work is edge materialization; e.g., a storage operation such as fetching data from a data store. Another example of meaningful work is the creation of two phantom execution heads that are the same, which need to be joined.

In operation 309, checking for the existence of the condition may include determining whether the execution path operation determined in operation 307 is non-selective. An execution path operation is non-selective if executing the operation does not reduce the number of rows in a set of intermediate query results. An example of a non-selective operation is creating a union from a disjunction. Another example of non-meaningful work is, if the in-memory data structure 166 includes a parent node and 2 disjunctive child nodes, bringing a variable from the parent into each of the disjunctive child nodes. An example of this scenario occurs with the query, "who are your followers?" The value of the you variable (corresponding to "your followers" in the query) is in the parent node. (An example of a value of the you variable is "urn:li:member:6," which uniquely identifies a particular user, or "John Smith," which may be used to identify a particular user.) If there are two types of followers, connections and followers, then there are two disjunctive child nodes. In this case the value of "you" needs to be propagated to the child nodes in order for the child nodes to determine their respective intermediate result sets. This operation of propagating "you" to the child nodes is not meaningful work.

If flow 301 determines in operation 309 that the execution path operation determined in operation 307 is non-selective or does not produce meaningful work, the condition exists and, in operation 311, the execution path operation determined in operation 307 is skipped. Skipping the operation may include skipping a table creation operation. For example, skipping the creation of an EP node, e.g., a node 202 or 204, eliminates the computational overhead associated with creation of the EP node and fetching of data from storage. If a table creation operation is skipped, then an execution head is created without a corresponding table. The execution head without a linked table is a phantom execution head; e.g., execution head 262.

In operation 309, checking for the existence of the condition may include determining whether the execution path operation determined in operation 307 is selective (e.g., the operation reduces the number of rows in an intermediate result set), meaning that the condition does not exist. Accordingly, flow 301 then proceeds to operation 313, where the EP operation determined in operation 307 is executed, which includes executing a table creation operation. For example, a table join operation results in a new intermediate result set; therefore, a new table is created in the in-memory data structure 166 to hold the new intermediate result set. An execution head may be created prior to executing the table creation operation.

Phantom execution heads enable computationally intensive or high-overhead operations to be either eliminated or deferred. For example, table creation operations can be delayed until flow 301 determines that meaningful work requiring creation of a new table has been performed. In dynamic query planning systems, deferring the work in this manner also allows costing operations to be deferred until the meaningful work is encountered, at which point all of the previous non-meaningful work can be factored into the costing. An example of this scenario is the query, "where do my connections and followers work?" In this query, there are two disjunctive branches but the union of those branches can be deferred until the query needs to materialize (fetch from storage) the employers of the connections and followers and costed along with the materialization at that time.

Distributed Declarative Decay

Decay as used herein may refer to an execution path operation that modifies relationship information stored in rows and/or tables of an in-memory data structure 166. When execution of a sub-query returns no results, there are no rows of data that need to be stored in an intermediate in-memory data structure 166. If a table has been created in the in-memory data structure to store intermediate results of the sub-query, and there are no intermediate results to store after the sub-query has been processed, the table can be decayed. A decay can be implemented by changing metadata associated with the table or row being decayed; for example changing the path type associated with the table or row from disjunctive to conjunctive.

An example of a scenario in which decay is useful occurs when an in-memory data structure 166 for a query has nested disjunctions, e.g., several layers of parent EP node and disjunctive child EP node combinations. In this situation, it may not become apparent that a child EP node ultimately has zero results until after execution path operations already have been performed for some of the nested disjunctions.

It is not mandated that a decay can only take place when all but one child node has non-zero results (and all siblings have zero results). Determining that decay is possible may happen at an early stage. For example, given three child nodes {A, B, and C}, if nodes A and B are processed first and their respective sub-queries produced zero results, then node C may be decayed back to the parent even before starting to work on the sub-query associated with node C. In this scenario, the sub-query for the "decayed" node is now processed at the parent node level. On the other hand, if (1) the sub-query of node C is processed first and produces non-zero results and then (2) nodes A and B are processed next, producing zero results, then node C may be decayed at that point.

The mechanism that enables the iterative decay is the execution head. Mappings stored in the execution heads maintain the query variable to EP node mapping information about the execution path that connects the EP nodes in the in-memory data structure 166, including the path type (e.g., conjunctive, disjunctive, or optional). Thus, path type metadata in the execution head for an EP node can be read and annotated to change the value from disjunctive to conjunctive.

Changing the path type from disjunctive to conjunctive results in certain computationally intensive path consistency operations, such as unzip operations, being skipped. Thus, propagating the decay back to the root node in nested disjunctions using the metadata maintained by the execution heads can avoid a significant number of computationally costly unzip operations.

In FIG. 3A, operation 309, checking for the existence of the condition may include determining whether the in-memory data structure 166 includes at least one nested disjunction, where a disjunction includes at least one parent table and a pair of disjunctive tables that are children of the parent table, and only one child table has non-zero rows (all other child tables have zero rows). If so, the condition exists and, in operation 311, skipping the operation includes skipping a path consistency checking operation, such as an unzip operation. If the in-memory data structure 166 does not include a nested disjunction with only one disjunctive child table that has non-zero rows, then the condition does not exist and, in operation 313, executing the operation includes executing a path consistency checking operation, such as an unzip operation.

Examples of Path Execution Operations

FIG. 4A, FIG. 4B, FIG. 4C, and FIG. 4D each are a flow diagram of a process that may be used to implement a portion of the computing system of FIG. 1.

To enforce path consistency in execution paths of an in-memory data structure 166, query service 160 maintains a number of rules or invariants that are associated with rows of tables 254 of the in-memory data structure 166 and/or relationships 258. A first invariant specifies that a valid path must exist from a root table (e.g., a table that is created at the beginning of a given query evaluation) in an in-memory data structure 166 to rows in all other tables 254 in in-memory data structure 166. A second invariant specifies that all paths from a given row in a destination or output table (e.g., output EP node 204) to a source or input table (e.g., input EP node 202) reach a common row in the source table. In other words, the first invariant requires a link to every destination row from a corresponding source row, and the second invariant requires multiple paths that arrive at the same destination row to begin at the same source row. If either invariant is not met by a given row in the in-memory data structure 166, then the row is removed.

Execution path operations 206 used with an in-memory data structure 166 to evaluate path queries and/or enforce path consistency during evaluation of the path queries include an expand operation, a reduce operation, a zip operation, an unzip operation, and a stitch operation. The expand operation expands one row in a table 254 of an in-memory data structure 166 into multiple rows in another table 254 of the in-memory data structure 166.

Figure 4A:
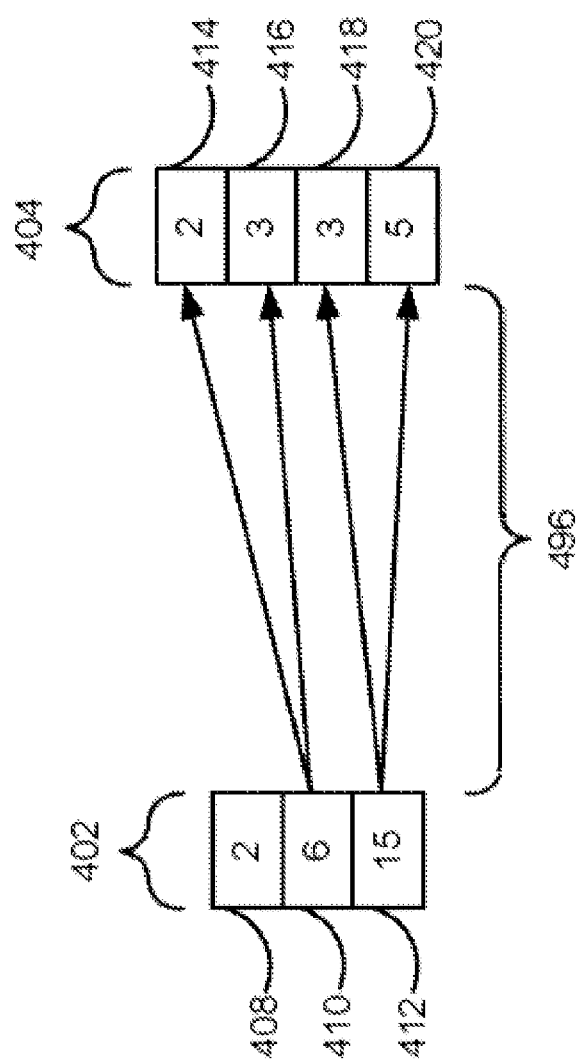
FIG. 4A, FIG. 4B, FIG. 4C, and FIG. 4D each are a flow diagram of a process that may be used to implement a portion of the computing system of FIG. 1.

As shown in FIG. 4A, an exemplary expand operation is applied to three rows 408-412 of an input table 402 to produce four rows 414-420 of an output table 404. In particular, the exemplary expand operation calculates a set of proper factors from values of 2, 6, and 15 in rows 408-412. As a result, output rows 414-416 store proper factors of 2 and 3 for the input value of 6 in row 410, and output rows 418-420 store proper factors of 3 and 5 for the input value of 15 in row 412. Because the input value of 2 in row 408 does not have any proper factors, table 404 does not include any output rows for row 408.

The exemplary expand operation also tracks relationships 496 between data in rows 408-412 of input table 402 and data in rows 414-420 in output table 404. For example, relationships 496 include two directed edges from row 410 to rows 414 and 416, and two directed edges from row 412 to rows 418 and 420. Consequently, relationships 496 identify which rows 408-412 in table 402 are used by the expand operation to generate rows 414-420 in table 404.

In turn, the expand operation allows query service 160 to process various types of data related to graph 132 and/or graph database 130. For example, query service 160 applies the expand operation to an input row of a source table containing a member identifier to identify a set of first-degree connections for the member represented by the member identifier. Query service 160 then stores the first-degree connections in a set of output rows of a destination table in an in-memory data structure 166 and connects the input and output rows with one or more relationships 258. In other words, query service 160 uses the expand operation to retrieve the member's first-degree connections from graph database 130.

In another example, query service 160 uses the expand operation to identify, in a source table with two columns, rows with (subject, predicate) or (object, predicate) pairs in a (subject, predicate, object) triple that defines edges 135, 137 in graph 132. First, query service 160 performs a trivial expand that creates an intermediate table and sets the evaluation mode of the intermediate table to optional. Next, query service 160 performs two additional expand operations from the intermediate table: one expand identifies (subject, predicate) pairs in the source table, and the other expand identifies (object, predicate) pairs in the source table. Query service 160 then changes the evaluation mode of the intermediate table to disjunctive, which causes rows that do not contain (subject, predicate) values or (object, predicate) values to be removed from the in-memory data structure 166.

In one or more embodiments, query service 160 performs the expand operation as a "batch expand" operation that generates a set of results from all rows in an input table of an in-memory data structure 166 before populating an output table with the results. For example, the batch expand can be used to calculate proper factors of values in all three rows 408-412 of table 402 before storing the proper factors in rows 414-420 of table 404 and establishing relationships 496 between the source and destination rows. In turn, the batch expand operation expedites database accesses required to retrieve data involved in the operation.

The reduce operation aggregates multiple rows from one or more tables 254 of an in-memory data structure 166 into a single row in another table of in-memory data structure 166. For example, the reduce operation is used to generate a sum, count, average, ratio, median, minimum, maximum, percentile, and/or other statistic or metric from a set of rows in one table, which are in turn generated from one row in another table. In turn, the aggregated values can be used to process queries such as counting the number of edges with a given subject and predicate.

Figure 4B:
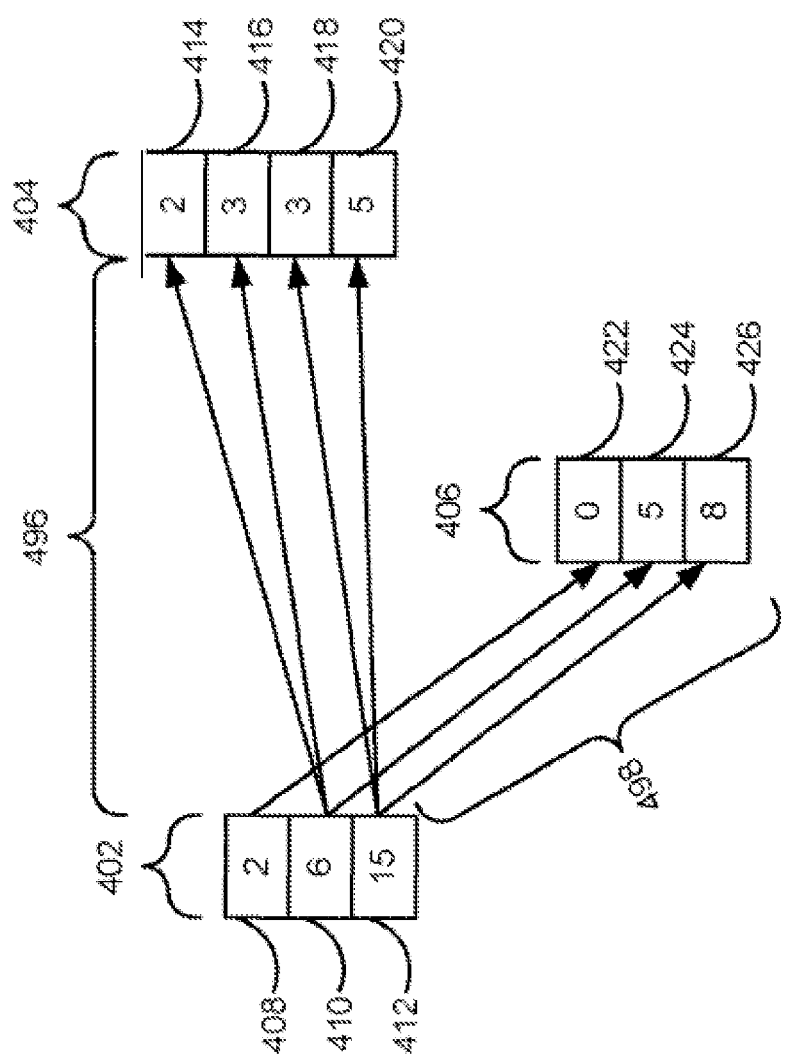

As shown in FIG. 4B, an exemplary reduce operation is used with the exemplary expand operation of FIG. 4A to produce a third table 406 from the contents of table 402 and/or table 404. More specifically, the exemplary reduce operation sums the proper factors generated from three rows 408-412 of table 402 and store the sums in three corresponding rows 422-426 of table 406. In the reduce operation, relationships 496 between table 402 and table 404 are used to identify groupings of rows 414-420 in table 404 from which the sums are generated. In particular, row 408 in table 402 is linked to zero rows in table 404, row 410 in table 402 is linked to rows 414-416 in table 404, and row 412 in table 402 is linked to rows 418-420 in table 404.

As a result, the input value of 2 in row 408 has an output value of 0 in row 422 (because 2 has zero proper factors), the input value of 6 in row 410 has an output value of 5 in row 424 (by summing the values of 2 and 3 in rows 414 and 416), and the input value of 15 in row 412 has an output value of 8 in row 426 (by summing the values of 3 and 5 in rows 418 and 420). A set of relationships 498 between tables 402 and 406 is used to track the generation of row 422 from row 408, the generation of row 424 from row 410, and the generation of row 426 from row 412.

In some embodiments, the reduce operation also supports aggregation functions that return more than one row. For example, the reduce operation can be used to return the top n rows from a source table.

The zip operation produces a cross product from source rows in multiple tables while ensuring that all paths from each row in the cross product reach a common row in all ancestors of the multiple tables. As a result, the zip operation can be used to establish or maintain path consistency in rows and/or tables of an in-memory data structure 166.

Figure 4C:
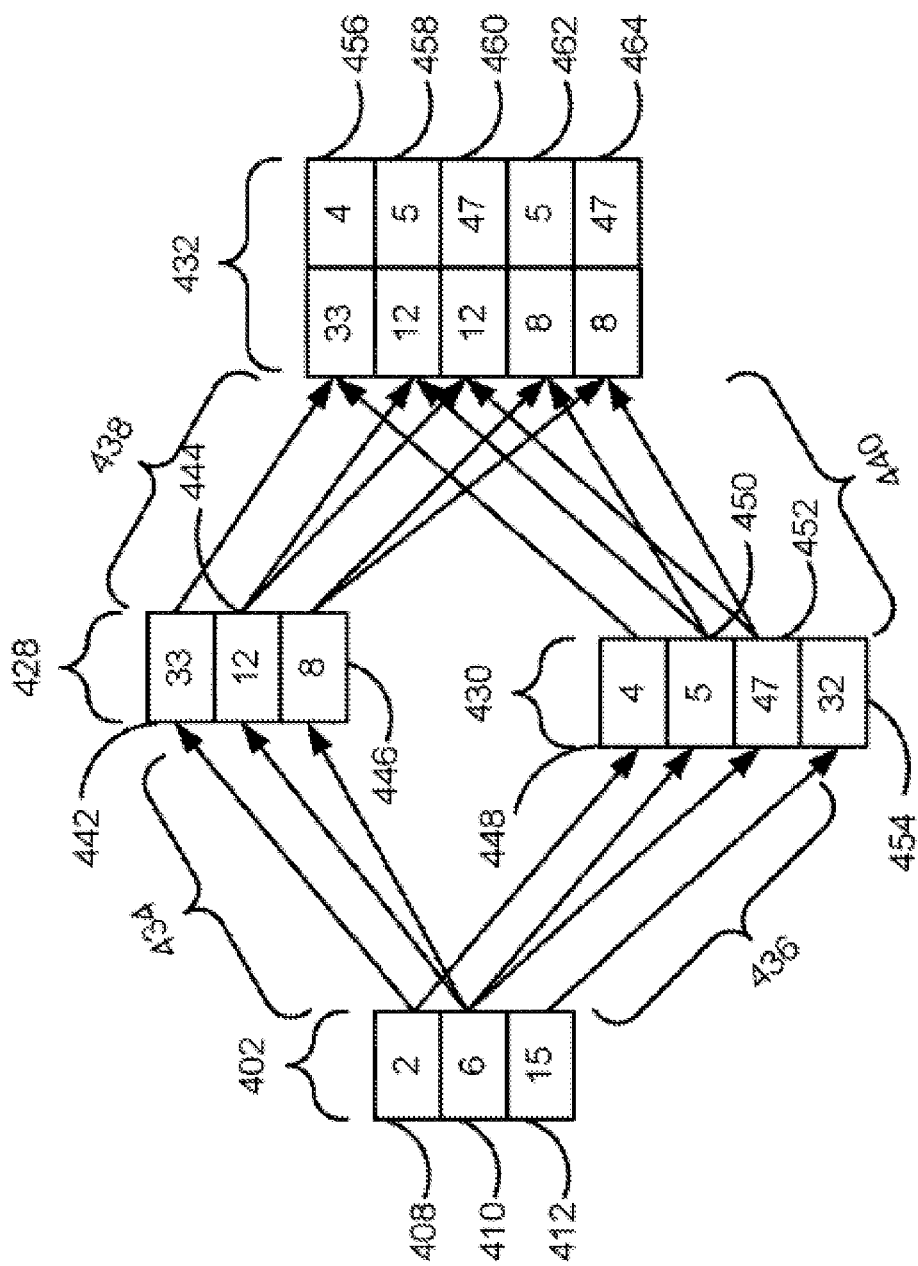
Figure 4D:
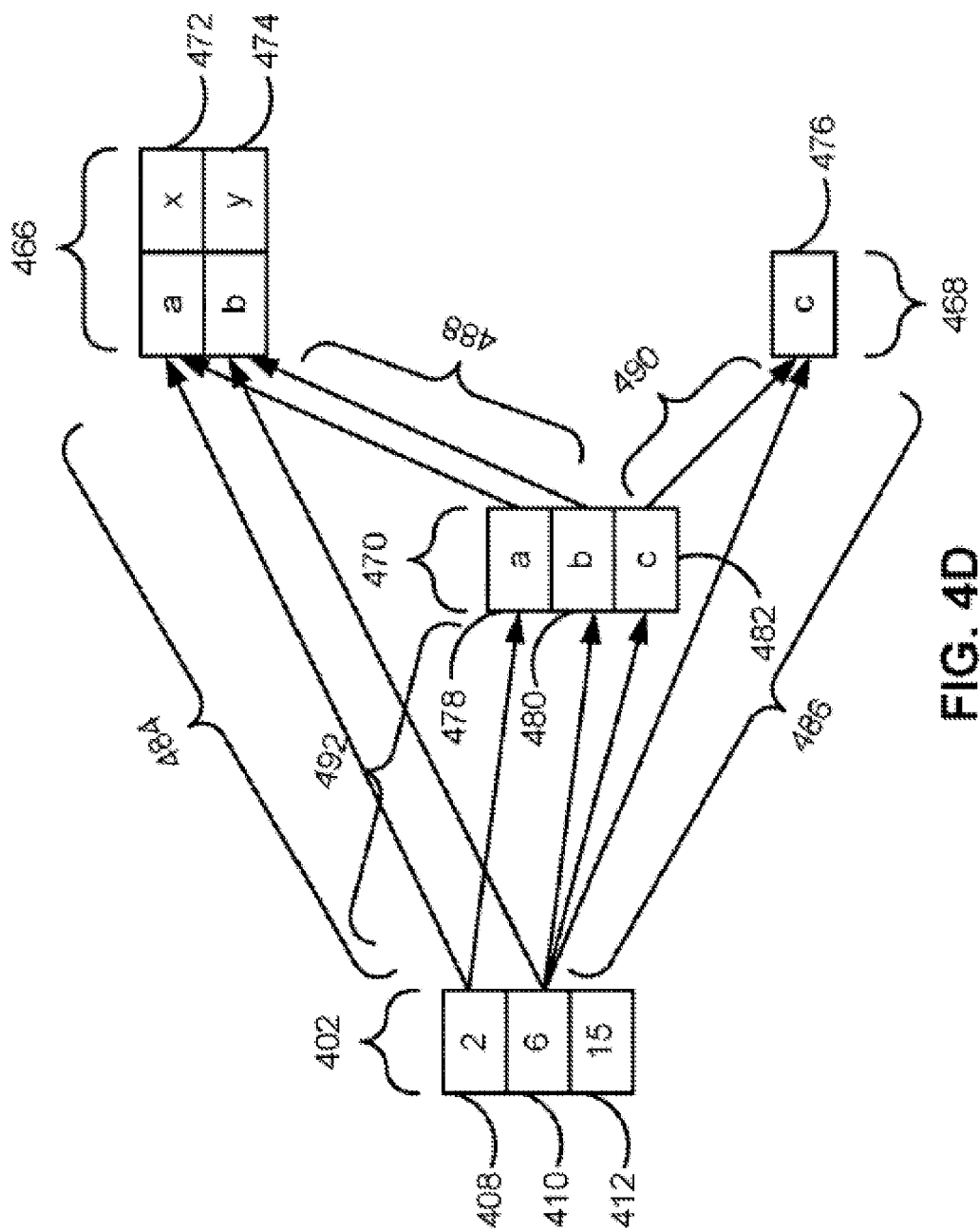

As shown in FIG. 4C, an exemplary zip operation is applied to rows 442-454 of two source tables 428-430 to produce an output table 432. Rows 456-464 in output table 432 contain cross products of rows 442-446 in table 428 and rows 448-454 in table 430. The cross products are further generated based on relationships 434 between rows 442-446 in table 428 and rows 408-412 of table 402, as well as an additional set of relationships 436 between rows 448-454 in table 430 and rows 408-412 of table 402. In this context, table 402 represents a common ancestor of table 428 and table 430 (i.e., a starting point of paths to table 428 and table 430).

In particular, relationships 434 indicate that within table 428, row 442 is generated from row 408 and rows 444-446 are generated from row 410. Relationships 436 indicate that, within table 430, row 448 is generated from row 408, rows 450-452 are generated from row 410, and row 454 is generated from row 412. These relationships 434-436 are automatically identified by query service 160 (e.g., using an in-memory data structure 166) while performing the zip operation instead of requiring the caller of the zip operation to manually specify tables or attributes involved in generating cross products using the zip operation. In other words, the zip operation inherently enforces path consistency during creation of rows 456-464 in table 432 from corresponding rows 442-454 in the source tables 428-430.

As a result, table 432 stores cross products of rows 442-454 in tables 428 and 430 that come from the same row in table 402. Row 456 in table 432 contains the cross product of row 442 and row 448 since both rows 442 and 448 are linked to row 408 in table 402. Similarly, rows 458-464 in table 432 contain the cross product of rows 444-446 and rows 450-452, since all four rows 444-446 and 450-452 are linked to the same row 410 in table 402. Finally, no rows in table 432 have paths that originate in row 412 since row 412 does not produce any rows in table 428. Generation of the cross products between tables 428 and 430 is further tracked in one set of relationships 438 between tables 428 and 432 and in another set of relationships 440 between tables 430 and 432.

Because the zip operation maintains path consistency in the in-memory data structure 166, the zip operation allows query service 160 to evaluate certain types of graph database 130 queries. One type of query includes a triangle query that retrieves all triples (a, b, c) where an edge with a specific predicate exists from a to b, b to c, and c to a. To process the query, query service 160 creates three source tables: one stores (a, b) pairs, another stores (b, c) pairs, and the third stores (c, a) pairs. Query service 160 then applies the zip operation to all three source tables to ensure that cross products in the resulting output table contain (a, b, c) triples that form triangles instead of hexagons. Consider [a0, a1] (meaning that variable a may have either value a0 or a1), [b0, b1], and [c0, c1], such that the following edges exists: a0→b0→c0→a1→b1→c1→a0 (which is a hexagon if drawn out). Locally this is indistinguishable from two triangles. For example, if pairings involving just (a) are considered, then edges a0→b0 and a1→b1 are visible, but it would not be possible to determine that the edges c1→a0 and c0→a1 exist. Examining the (b, c) pairing would reveal that b0→c1 and b1→c0 do not exist; therefore, a hexagon exists. This is true for any polygon with a factor of three (e.g., nonagons).

In one or more embodiments, query service 160 streamlines the zip operation by generating cross products using a worst-case optimal join of the source tables. First, query service 160 constructs a new relation (or new table) for one or more source tables in the zip operation. Rows in the new relation represent rows in the source table(s), and columns in the relation represent source rows of the rows in common ancestors of the source tables. As a result, each column in the relation represents an attribute that affects cross products produced by the zip operation. Query service 160 then performs the zip operation by incrementally adding columns to the relation and evaluating the cross products using the attribute represented by each new column until all ancestors of the source table are included in the relation.

Unlike the zip operation, the unzip operation is used to extract a subset of columns from existing tables 330. Input to the unzip operation includes one or more source tables and one or more "base" tables in an in-memory data structure 166. The unzip operation extracts one or more columns from the source table(s) into a destination table, creates a first set of links from rows of the destination table to corresponding rows in the source table(s), and creates a second set of links from additional rows of the base table(s) to the rows in the destination table based on paths between rows in the base table to the rows in the destination table. As a result, the unzip operation creates both incoming links to the newly created destination table (i.e., from the base table(s)) and outgoing links from the destination table (i.e., to the source table(s)).

As shown in FIG. 4D, table 402 acts as a base table for an exemplary unzip operation, and two other tables 466-468 act as source tables for the unzip operation. The unzip operation creates an output table 470 with two rows 478-480 extracted from two rows 472-474 of table 466 and one row 482 extracted from one row 476 of table 468. Rows 478-480 store values from the first column of table 466, which is also specified as input to the unzip operation, and row 482 stores a value from the only column of table 468, which is optionally specified as input to the unzip operation.

The unzip operation also creates relationships 488-490 between rows 478-482 of table 470 and corresponding rows 472-476 of tables 466-468 used to populate rows 478-482. More specifically, relationships 488 include outgoing links from rows 478 and 480 of table 470 to rows 472 and 474 of table 466, respectively. Similarly, relationship 490 includes an outgoing link from row 482 of table 470 to row 476 of table 468.

The unzip operation additionally creates relationships 492 between rows 478-482 of table 470 and rows 408-410 of the base table 402 with paths to rows 472-476 of source tables 466-468 used to populate table 470. Relationships 492 include an outgoing link from row 408 of table 402 to row 478 of table 470 and two outgoing links from row 410 of table 402 to rows 480-482 of table 470. The link from row 408 to row 478 indicates that row 478 is created from row 472, which includes a path to the source row 408 in the base table 402. Links from row 410 to rows 480-482 indicate that rows 480-482 are created from rows 474-476 with paths to the same source row 410 in the base table 402.

The unzip operation is further performed based on the evaluation mode of the destination table (e.g., table 470 of FIG. 4D). If the destination table is disjunctive, then each row in the destination table maps to a corresponding row in a source table and a row in a base table that is connected to the row in the source table by a path. If the destination table is conjunctive, rows in the destination table are deduplicated.

The unzip operation can be used to process queries that involve the intersection of two or more sets of values. For example, query service 160 processes a query for identifying a set of users that have worked at two companies. First, query service 160 performs a series of expand and/or other execution path operations 206 to create tables 254 storing nodes, edges, and/or predicates related to employees at each individual company. These operations 206 result in one table storing the employees of one company and another table storing the employees of another company. Query service 160 then performs a conjunctive unzip using the two tables as source tables and a common ancestor of the two tables as a base table to create a destination table storing a deduplicated set of employees that have worked at both companies.

The stitch operation creates a link between a first row in a destination table and a second row in a source table when the first and second rows share a common ancestor and one or more columns with matching values. As a result, the stitch operation can be used to explicitly identify a previously implicit relationship between the column(s) in the source and destination tables and, in turn, enforce path consistency between the source and destination tables.

Example Path Query Evaluation Process

Figure 5:
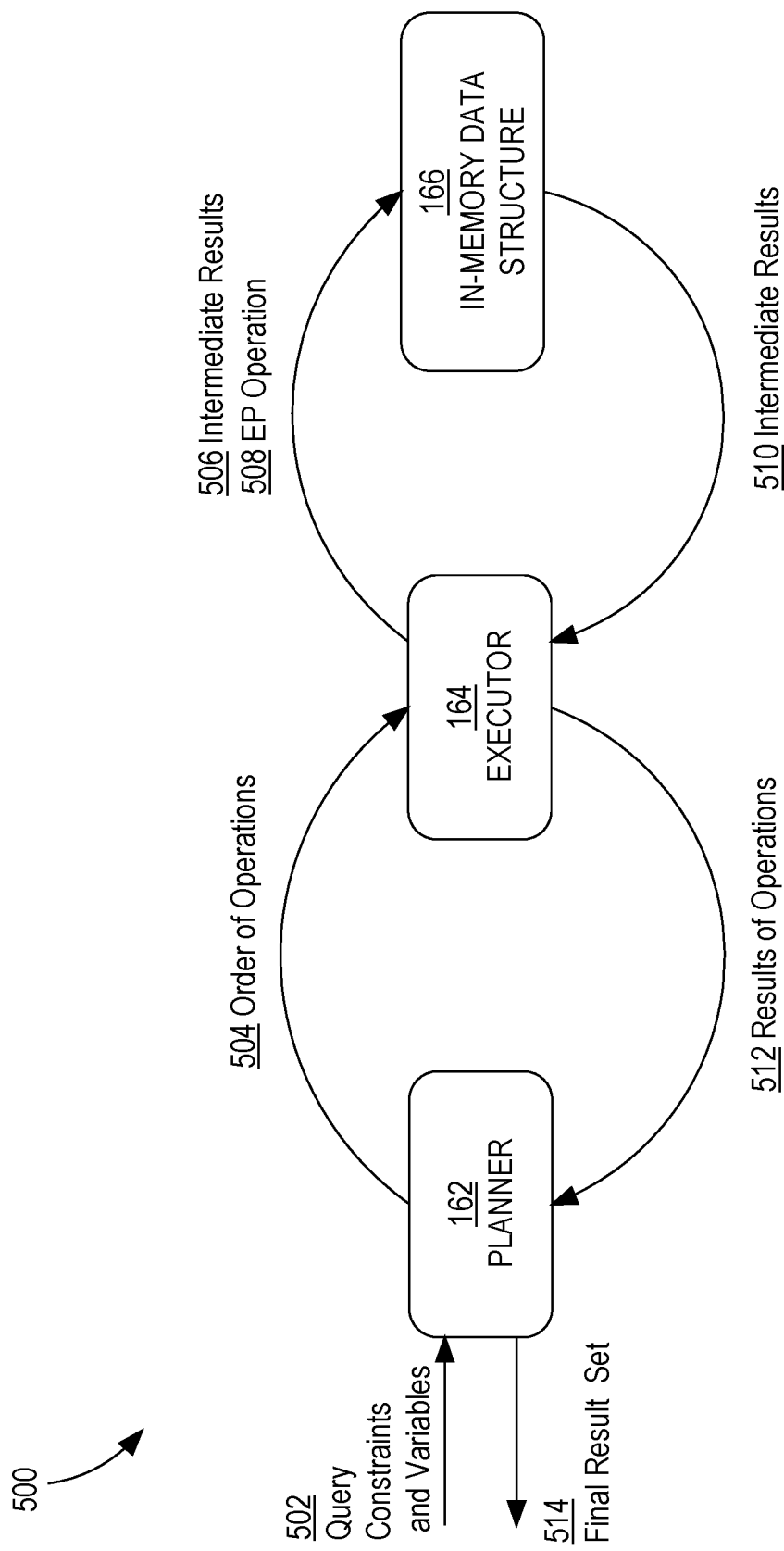
FIG. 5 is a flow diagram of a process that may be used to implement a portion of the computing system of FIG. 1.

FIG. 5 is a flow diagram of a process that may be used to implement a portion of the computing system of FIG. 1. The operations of a flow 500 as shown in FIG. 5 can be implemented using processor-executable instructions that are stored in computer memory. For purposes of providing a clear example, the operations of FIG. 5 are described as performed by a machine of computing system 100, but other embodiments may use other systems, devices, or implemented techniques. More specifically, flow 500 illustrates operations that may be performed by, for example, query service 160, to evaluate a path query.

In flow 500, planner 162 reads query constraints and variables 502, which correspond to a path query in graph database 130. A translator/compiler component of query service, not shown, may produce query constraints and variables 502 from an input graph query. That is, an input graph query, which may specify a set of graph nodes, edges, and predicates, is compiled into query constraints and variables 502.

Given query constraints and variables 502, planner 162 determines an order of query evaluation operations 504. To do this, planner 162 may engage in a dynamic planning process in which each possible query evaluation operation is assigned a cost based on, for example, its computational load, and then planner 162 may determine the order of operations to, for example, defer the highest cost operations.

Planner 162 passes order of operations 504 to executor 164. Executor 164 determines and executes execution path operations 508. Execution path operations 508 are determined by executor 164 based on query constraints and variables 502. In this way, executor 164 implements order of operations 504 by applying one or more EP operations 508 to an initial set of intermediate results 506 that have been retrieved from a source data store and stored in a first table in the in-memory data structure 166. Applying an EP operation 508 to the initial set of intermediate results 506 produces a new set of intermediate results 510, which are stored in a new table in the in-memory data structure 166, where the new table has a link to the first table.

Intermediate results 510 may be passed by executor 164 back to planner 162 as results of operations 512. Planner 162 determines whether results of operations 512 are the final set of query results. For example, planner 162 determines whether all constraints associated with intermediate results 510 have been satisfied. If so, planner 162 returns results of operations 512 as final result set 514. If the constraints have not been satisfied, planner re-performs costing and issues new order of operations 504, which in turn initiates a new round of query execution processing by executor 164.

Example Hardware Architecture

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 6:
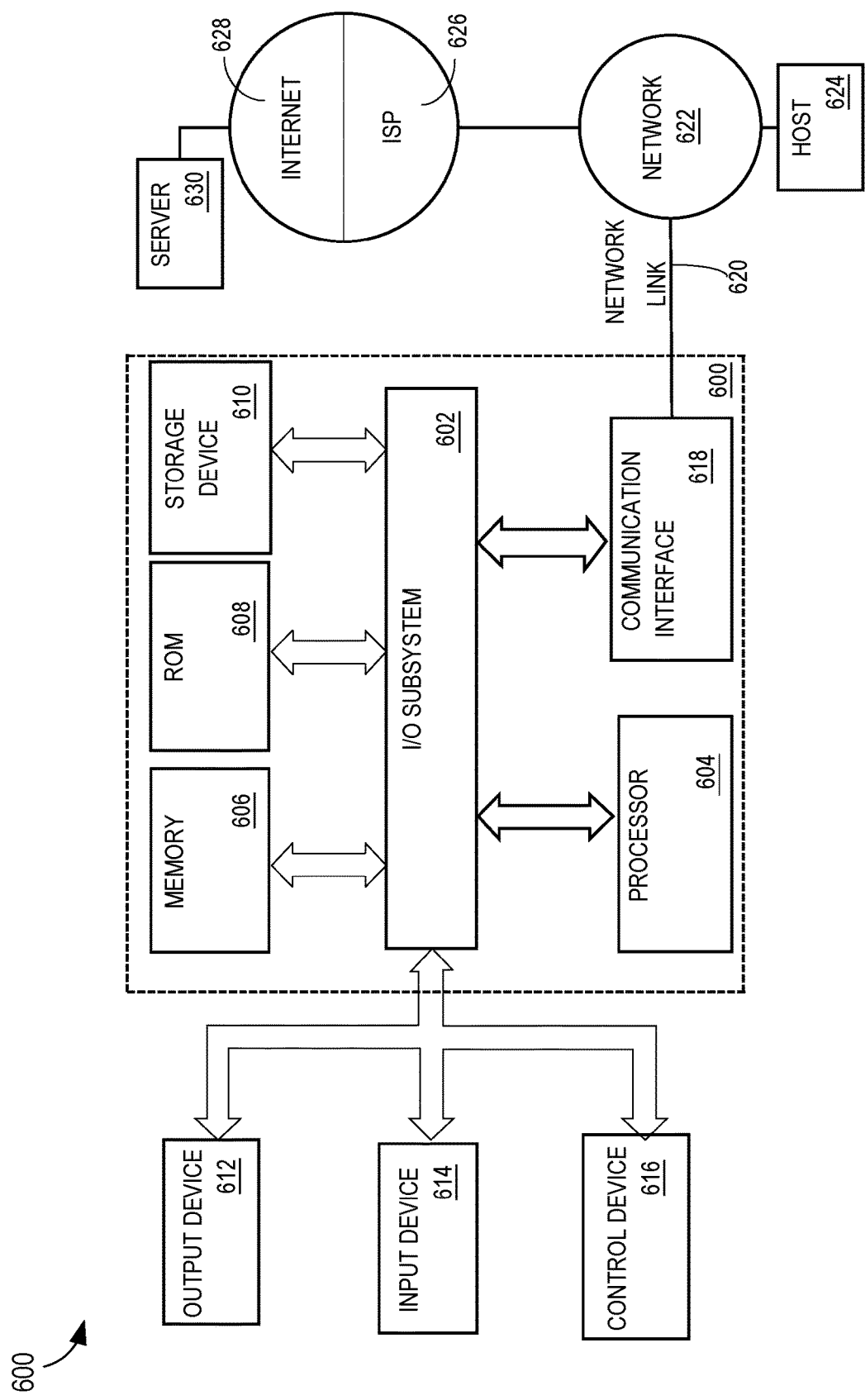
FIG. 6 is a block diagram illustrating an embodiment of a hardware system, which may be used to implement various aspects of the computing system of FIG. 1.

For example, FIG. 6 is a block diagram that illustrates a computer system 600 upon which an embodiment of the present invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory computer-readable storage media accessible to processor 604, render computer system 600 into a special-purpose machine that is customized to perform the operations specified in the instructions.

Computer system 600 and further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to an output device 612, such as a display, such as a liquid crystal display (LCD) or a touchscreen display, for displaying information to a computer user, or a speaker, a haptic device, or another form of output device. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, at least one ASIC or FPGA, firmware and/or program logic which in combination with the computer system causes or programs computer system 600 to be a special-purpose machine. According to one embodiment, the techniques herein are performed by computer system 600 in response to processor 604 executing at least one sequence of instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying at least one sequence of instruction to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated-services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through at least one network to other data devices. For example, network link 620 may provide a connection through local network 622 to a host computer 624 or to data equipment operated by an Internet Service Provider (ISP) 626. ISP 626 in turn provides data communication services through the world-wide packet data communication network commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 530 might transmit a requested code for an application program through Internet 628, ISP 626, local network 622 and communication interface 618. The received code may be executed by processor 604 as it is received, and/or stored in storage device 610, or other non-volatile storage for later execution.

ADDITIONAL EXAMPLES

Illustrative examples of the technologies disclosed herein are provided below. An embodiment of the technologies may include any of the examples or a combination of the described below.

In an example 1, a method includes reading a query that traverses at least two nodes and at least one edge of a graph in a graph database; compiling the query into a set of variables and a set of constraints, the set of variables and the set of constraints corresponding to the at least two nodes and the at least one edge of the graph; creating an in-memory data structure comprising at least one table; using the set of variables and the set of constraints, determining an operation that is performable using the in-memory data structure; checking for an existence of a condition relating to the in-memory data structure or the operation; if the condition exists, skipping the operation; if the condition does not exist, executing the operation; and storing a set of intermediate query results in the at least one table.

An example 2 includes the subject matter of example 1, further including where checking for the existence of the condition comprises determining whether a variable of the set of variables is a single row variable. An example 3 includes the subject matter of example 2, further including, if the variable is a single row variable, then the condition exists and skipping the operation comprises skipping a path consistency checking operation. An example 4 includes the subject matter of example 1, further including reading the set of intermediate query results from a data storage. An example 5 includes the subject matter of example 1, further including where checking for the existence of the condition comprises determining whether a variable of the set of variables is a multi-row variable. An example 6 includes the subject matter of example 5, further including, if the variable is a multi-row variable, the condition does not exist and executing the operation comprises executing a path consistency checking operation. An example 7 includes the subject matter of example 6, further including executing the path consistency checking operation prior to reading the set of intermediate query results from a data storage. An example 8 includes the subject matter of example 1, further including where checking for the existence of the condition comprises determining whether the operation is non-selective. An example 9 includes the subject matter of example 8, further including, if the operation is non-selective, the condition exists and skipping the operation comprises skipping a table creation operation. An example 10 includes the subject matter of example 9, further including creating an execution head without executing the table creation operation.

An example 11 includes the subject matter of example 1, further including where checking for the existence of the condition comprises determining whether the operation is selective. An example 12 includes the subject matter of example 11, further including, if the operation is selective, the condition does not exist and executing the operation comprises executing a table creation operation. An example 13 includes the subject matter of example 12, further including creating an execution head prior to executing the table creation operation.

An example 14 includes the subject matter of example 1, further including where checking for the existence of the condition comprises determining whether the in-memory data structure comprises a nested disjunction that includes at least one disjunctive child table that has zero rows. An example 15 includes the subject matter of example 14, further including, if the in-memory data structure comprises a nested disjunction that includes at least one disjunctive child table that has zero rows, the condition exists and skipping the operation comprises skipping a path consistency checking operation. An example 16 includes the subject matter of example 15, further including, if the in-memory data structure does not comprise a nested disjunction that includes at least one disjunctive child table that has zero rows, the condition does not exist and executing the operation comprises executing a path consistency checking operation.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

Terms such as "computer-generated" and "computer-selected" as may be used herein may refer to a result of an execution of one or more computer program instructions by one or more processors of, for example, a server computer, a network of server computers, a client computer, or a combination of a client computer and a server computer.

As used here, "online" may refer to a particular characteristic of a connections network-based system. For example, many connections network-based systems are accessible to users via a connection to a public network, such as the Internet. However, certain operations may be performed while an "online" system is in an offline state. As such, reference to a system as an "online" system does not imply that such a system is always online or that the system needs to be online in order for the disclosed technologies to be operable.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A method comprising:
reading a query that traverses at least two nodes and at least one edge of a graph in a graph database;
compiling the query into a set of variables and a set of constraints, the set of variables and the set of constraints corresponding to the at least two nodes and the at least one edge of the graph;
creating an in-memory data structure comprising at least one table;
using the set of variables and the set of constraints, determining an operation that is performable using the in-memory data structure;
checking for an existence of a condition relating to the in-memory data structure or the operation;
if the condition exists, skipping the operation;
if the condition does not exist, executing the operation;
storing a set of intermediate query results in the at least one table;
wherein checking for the existence of the condition comprises determining whether the in-memory data structure comprises a nested disjunction that includes at least one disjunctive child table that has zero rows;

if the in-memory data structure comprises a nested disjunction that includes at least one disjunctive child table that has zero rows, the condition exists and skipping the operation comprises skipping a path consistency checking operation; and if the in-memory data structure does not comprise a nested disjunction that includes at least one disjunctive child table that has zero rows, the condition does not exist and executing the operation comprises executing a path consistency checking operation;

wherein the method is performed by at least one computing device.

2. The method of claim 1, wherein checking for the existence of the condition comprises determining whether a variable of the set of variables is a single row variable.

3. The method of claim 2, wherein, if the variable is a single row variable, the condition exists and skipping the operation comprises skipping a path consistency checking operation.

4. The method of claim 3, further comprising reading the set of intermediate query results from a data storage.

5. The method of claim 1, wherein checking for the existence of the condition comprises determining whether a variable of the set of variables is a multi-row variable.

6. The method of claim 5, wherein, if the variable is a multi-row variable, the condition does not exist and executing the operation comprises executing a path consistency checking operation.

7. The method of claim 6, further comprising executing the path consistency checking operation prior to reading the set of intermediate query results from a data storage.

8. The method of claim 1, wherein checking for the existence of the condition comprises determining whether the operation is non-selective.

9. The method of claim 8, wherein, if the operation is non-selective, the condition exists and skipping the operation comprises skipping a table creation operation.

10. The method of claim 9, further comprising creating an execution head without executing the table creation operation.

11. The method of claim 1, wherein checking for the existence of the condition comprises determining whether the operation is selective.

12. The method of claim 11, wherein, if the operation is selective, the condition does not exist and executing the operation comprises executing a table creation operation.

13. The method of claim 12, further comprising creating an execution head prior to executing the table creation operation.

14. At least one non-transitory machine-readable storage medium comprising instructions which, when implemented by at least one machine, cause the at least one machine to perform operations comprising:

reading a query that traverses at least two nodes and at least one edge of a graph in a graph database;

compiling the query into a set of variables and a set of constraints;

creating an in-memory data structure comprising at least one table;

using the set of variables and the set of constraints, determining an operation that is performable using the in-memory data structure;

checking for an existence of a condition relating to the in-memory data structure or the operation;

if the condition exists, skipping the operation;

storing a set of intermediate query results in the at least one table; and if the condition does not exist, executing the operation;

wherein checking for the existence of the condition comprises:

determining whether a variable of the set of variables is a single row variable, and if the variable is a single row variable, the condition exists and skipping the operation comprises skipping a path consistency checking operation; or determining whether a variable of the set of variables is a multi-row variable, and if the variable is a multi-row variable, the condition does not exist and executing the operation comprises executing a path consistency checking operation.

15. At least one non-transitory machine-readable storage medium comprising instructions which, when implemented by at least one machine, cause the at least one machine to perform operations comprising:

reading a query that traverses at least two nodes and at least one edge of a graph in a graph database;

compiling the query into a set of variables and a set of constraints;

creating an in-memory data structure comprising at least one table;

using the set of variables and the set of constraints, determining an operation that is performable using the in-memory data structure;

checking for an existence of a condition relating to the in-memory data structure or the operation;

if the condition exists, skipping the operation;

storing a set of intermediate query results in the at least one table; and if the condition does not exist, executing the operation;

wherein checking for the existence of the condition comprises:

determining whether the operation is non-selective, and if the operation is non-selective, the condition exists and skipping the operation comprises skipping a table creation operation; or determining whether the operation is selective, and if the operation is selective, the condition does not exist and executing the operation comprises executing a table creation operation.

16. At least one non-transitory machine-readable storage medium comprising instructions which, when implemented by at least one machine, cause the at least one machine to perform operations comprising:

reading a query that traverses at least two nodes and at least one edge of a graph in a graph database;

compiling the query into a set of variables and a set of constraints;

creating an in-memory data structure comprising at least one table;

using the set of variables and the set of constraints, determining an operation that is performable using the in-memory data structure;

checking for an existence of a condition relating to the in-memory data structure or the operation;

if the condition exists, skipping the operation;

storing a set of intermediate query results in the at least one table; and if the condition does not exist, executing the operation;

wherein checking for the existence of the condition comprises:

determining whether the in-memory data structure comprises a nested disjunction that includes at least one disjunctive child table that has zero rows;

if the in-memory data structure comprises a nested disjunction that includes at least one disjunctive child table that has zero rows, the condition exists and skipping the operation comprises skipping a path consistency checking operation; or if the in-memory data structure does not comprise a nested disjunction that includes at least one disjunctive child table that has zero rows, the condition does not exist and executing the operation comprises executing a path consistency checking operation.

* * * * *